# 2,890,205

PROCESS FOR THE PREPARATION OF POLYESTERS, INCLUDING ALKYL BENZOYLBENZOATE

William Howells Vinton, Parlin, N.J., assignor to E. I. du Pont de Nemours and Company, Wilmington, Del., a corporation of Delaware No Drawing. Application August 28, 1953
Serial No. 377,259

2 Claims. (Cl. 260—63)

This invention is concerned with a method of controlling the molecular weight of polymeric esters of glycols and terephthalic acid. More particularly, it relates to such a method wherein an alkyl o-benzoylbenzoate is used. Still more particularly it relates to a method of controlling the molecular weight of poly(ethylene terephthalates) with calculated amounts of a methyl o-benzoylbenzoate.

Various methods have been proposed to control the degree of polymerization of polymeric linear esters of glycols and terephthalic acid or an ester-forming derivative of terephthalic acid, including the use of monofunctional acids, ester-forming derivatives of such acids and monofunctional alcohols. However, the proposed acids and alcohols have some economic disadvantages and do not always make the resulting polyester suitable for use in the form of strong coherent sheets of film of uniform quality.

It has been found that the alkyl o-benzoylbenzoates and monoalkyl-substituted o-benzoylbenzoates wherein the alkyl groups contain 1 to 4 carbon atoms and the alkyl substituent is in the benzene ring of the benzoyl group when admixed with a glycol, e.g., a polymethylene glycol of 2 to 10 carbon atoms, and terephthalic acid or an ester-forming derivative thereof during a polymeric esterification reaction effectively control the molecular weight and viscosity of the resulting highly polymeric poly(alkylene terephthalate). The alkyl radicals attached to the benzene ring or the —COO— radical include methyl, ethyl, n-propyl, and n-butyl radicals and preferably are methyl radicals.

The above control of the polyesters enables one to cast therefrom continuous films and fibers which after orientation by stretching, result in films and fibers having good strength uniformity. Film made by the process is especially useful as photographic film base. Uniformity of properties for this purpose is of considerable importance because of the rigid specifications and the costly operations involved in the manufacture of photographic film. Small variations in the molecular weight and viscosity of cast polyester films and extruded fibers, in continuous operations, obviously present production difficulties, in their preparation and use such as poor gauge control, difficulties in metering and nonuniformity of dyeing.

The process of this invention may be carried out in two stages advantageously, by first admixing, in a suitable polymerization reaction vessel, the terephthalic acid or an ester-forming derivative thereof, with the glycol in excess, preferably a 1:2 to 1:4 mol ratio and heating the admixture to a temperature of 150° C. to 265° C. for a period sufficient to yield a large amount of the monomeric diester of the glycol with terephthalic acid. A suitable period is from 15 to 120 minutes. The lower alkyl o-benzoylbenzoate or monoalkyl-substituted o-benzoylbenzoate is then mixed with the preformed monomeric diester and the mixture heated under a reduced pressure of 0.001 to 7 mm. of mercury, with continuous agitation, for a period of 15 to 600 minutes.

The amount of alkyl benzoylbenzoate used will depend upon the intrinsic viscosity or molecular weight desired for the polyester. The intrinsic viscosity, as defined below, may vary from 0.45 to 0.60. A practical range of methyl o-benzoylbenzoate is 2.08% to 1.45% by weight of the final polyester. The corresponding amount of the o-benzoylbenzoate radical will vary in the amount from 1.94% to 1.36% of the molecular weight of the polyalkylene terephthalate, exclusive of the benzoylbenzoate radical. If a higher alkyl o-benzoylbenzoate or such a benzoate containing an alkyl substituent in the benzoyl group is used, the amount is increased in direct proportion to the increase in molecular weight of such ester over the methyl o-benzoylbenzoate.

In this application "intrinsic viscosity" is defined as $$\frac{4(Nr^{\frac{1}{4}}-1)}{C}$$

wherein Nr is the viscosity of a dilute solution of the polyester in a mixture of phenol and trichlorphenol divided by the viscosity of the phenol/trichlorphenol solvent in the same units and at the same temperature and C is the concentration in grams of polyester per 100 ml. of solution. Intrinsic viscosity, as is well known, is a measure of molecular weight and the above intrinsic viscosities are believed to result in molecular weights from 23,300 to 33,500.

A suitable reaction vessel for making small quantities of the polyesters is shown in the drawing of Alles and Saner U.S. application Ser. No. 344,412, filed March 24, 1953 (U.S. Patent 2,758,105, August 7, 1956). The conventional types of condensation polymerization apparatus can be used with the processes of this invention.

The invention will be further illustrated but is not intended to be limited by the following examples.

Example I

Dimethyl terephthalate and ethylene glycol (1:3 mole ratio) were heated together in the presence of litharge (0.01% based on the weight of dimethyl terephthalate) at a temperature of 160° to 235° C., to give a product having a polymer equivalent of 81.3%, of the following composition:

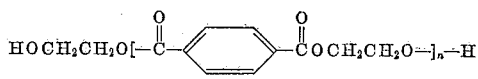

where n=1 to 6. Six-gram samples of this monomer were placed in each of two polymerization tubes of the type shown in the aforesaid U.S. application Ser. No. 344,412. Ninety six thousandths gram of methyl-o-(p-methylbenzoyl)-benzoate (1.96% based on polymer yield) was added to one tube and no benzoylbenzoate was added to the second tube. Both tubes were heated to 277° to 278° C. The pressure was reduced gradually to 0.40 mm. of mercury and the polymerization continued, with agitation, for six hours in the case of the sample containing methyl-o-(p-methylbenzoyl)benzoate and for three hours in the case of the control. The intrinsic viscosity of the polyethylene terephthalate made in the first tube was 0.45 and that in the second tube was 0.70.

Example II

Six grams of the monomer of Example I were placed in each of two reaction vessels. Nine hundredths gram of methyl o-benzoylbenzoate was added to one vessel while no terminator was added to the second vessel. Both mixtures were heated to 277° to 278° C. The pressure was then reduced gradually to 0.40 mm. of mercury and the polymerization continued, with agitation, for six hours in the case of the first and three hours in the case of the second vessel. The intrinsic viscosity of the polyester from the first vessel was 0.52 and that from the second was 0.70.

In place of the ethylene glycol described in the foregoing examples there may be substituted other polymethylene glycols having 2 to 10 methylene groups, with similar results. Suitable other glycols include tri-, tetra-, penta-, hexa-, hepta-, nona- and deca-methylene glycols. Mixtures of two or more of these glycols, or of one or more of them with ethylene glycol, can be used if desired.

Similarly, in place of the dimethyl terephthalate one may substitute diethyl terephthalate, dipropyl terephthalate, di n-butyl terephthalate, terephthalic acid, terephthalic acid chloride and terephthalic acid bromide with similar results. These esterifying agents can be used with ethylene glycol of the glycols and mixtures of glycols described in the previous paragraph. Similar results can be obtained by substituting ethyl-o-(o-, m-, and p-methylbenzoyl)benzoates, ethyl o-benzoylbenzoate, propyl o-benzoylbenzoate, and n-butyl o-benzoylbenzoate for the specific benzoate of the examples.

The invention obviously is not limited to the specific catalyst of the previous examples. Other suitable esterification or ester interchange catalysts include lithium, sodium, potassium, calcium, beryllium, magnesium, zinc, cadmium, aluminum, chromium, molybdenum, manganese, iron, cobalt, nickel, copper, silver, mercury, tin, lead, bismuth, antimony, platinum, and palladium. Suitable proportions are from 0.025% to 0.1% of the weight of the ester of the dicarboxylic acid used. The catalysts may be added as such in the form of powder, chips, shavings, ribbon, wire or in any other convenient form. The alkali metals, the alkaline earth metals, or magnesium are conveniently used in the form of alcoholates, formed by dissolving them in the glycol to be used or in a monohydric alcohol such as methyl or ethyl alcohol. The alkali metals may also be used in the form of their carbonates or other alkaline reacting salts, for example, borates. Magnesium may be used in the form of its oxide.

When methyl benzoate is substituted for the methyl o-benzoylbenzoates of the foregoing examples it is difficult to control the intrinsic viscosity at any predetermined value. This is exemplified in the following procedure:

Dimethyl terephthalate and ethylene glycol (1:2 mole ratio) were heated in the presence of 0.121% of zinc salicylate ($Zn(C_7H_5O_3)_2.3H_2O$) and 1.04% methyl benzoate (equivalent to 1.83% of methyl o-benzoylbenzoate and designed to give an intrinsic viscosity of 0.50) at a temperature of 160° C. to 244° C., until the theoretical yield of methanol had been obtained. The temperature was then increased to 277° C. to 278° C. and the pressure was gradually reduced to 0.3 mm. of mercury. The reaction was continued for three hours with stirring. The intrinsic viscosity of the polymer was determined to be 0.62 compared to 0.66 for a control prepared under identical conditions in the absence of methyl benzoate. In this instance the methyl benzoate was practically ineffective in controlling the intrinsic viscosity.

The polymethylene terephthalates of this invention have the advantage that their properties are quite uniform. This makes them especially valuable for the preparation of biaxially oriented films of 0.003 to 0.008 inch thickness which are useful as photographic film base. The polyesters can be cast, coated with any of the vinylidene chloride, acrylic ester, itaconic acid copolymers described in Alles and Saner U.S. Patent 2,627,088, February 3, 1953, then biaxially oriented as described in that patent. After stretching, the film can be coated with a water-permeable colloid layer and a colloid silver halide emulsion of the kinds and as described in U.S. Patent 2,627,088.

The polymethylene terephthalates made in accordance with this invention are useful for the preparation of filaments, fibers and textile materials, shaped plastic articles, etc., the same as the prior art polyesters, but being more uniform in quality are more suitable in such arts. They show a markedly lower tendency to vary in molecular weight which is advantageous.

Another advantage is that films and fibers formed from polymers made by the above procedures have better gauge uniformity or more uniform cross-section. The fibers, moreover, dye more uniformly. Since the intrinsic viscosity can be controlled within narrow limits production difficulties are minimized.

What is claimed is:

1. A process for the preparation of a highly polymeric polyalkylene terephthalate which comprises heating to a temperature of 150° C. to 265° C. a mixture of a glycol of the formula $HO(CH_2)_nOH$, where $n$ is 2 to 10, and a compound taken from the group consisting of terephthalic acid, dialkyl terephthalates wherein said alkyl radical is an n-alkyl radical of 1 through 4 carbon atoms, terephthalic acid chloride and terephthalic acid bromide in the presence of an esterification catalyst to form a monomeric diester, and mixing said diester with a monomeric ester taken from the group consisting of alkyl-o-benzoylbenzoates and alkyl-o-(alkylbenzoyl)benzoates wherein said alkyl groups contain 1 to 4 carbon atoms and heating such mixture under a reduced pressure of 0.001 to 7 mm. of mercury at a temperature between 150° C. and 278° C. for a period of 15 to 600 minutes to form a highly polymeric ester having a molecular weight between 23,300 and 33,500, said monomeric ester being used in such an amount that the benzoylbenzoate radical of said monomeric ester constitutes from 1.94% to 1.36% of the molecular weight of the polyalkylene terephthalate exclusive of the benzoylbenzoate radical, and heating the admixture to a temperature between 150° C. and 278° C. at a pressure from 0.001 to 7.0 mm. of mercury for a period of 15 to 600 minutes.

2. A process as set forth in claim 1 wherein said glycol is ethylene glycol and said derivative is dimethyl terephthalate.

References Cited in the file of this patent

UNITED STATES PATENTS

| | | |
|---|---|---|
| 2,477,657 | Schaefer | Aug. 2, 1949 |
| 2,635,089 | Anderson | Apr. 14, 1953 |
| 2,730,517 | Vogel | Jan. 10, 1956 |
| 2,758,105 | Alles et al. | Aug. 7, 1956 |